United States Patent [19]

Bar-Zohar

[11] Patent Number: 4,575,754

[45] Date of Patent: Mar. 11, 1986

[54] VIDEO SCRAMBLER SYSTEM

[75] Inventor: Meir Bar-Zohar, Lawrenceville, N.J.

[73] Assignee: RCA Corporation, Princeton, N.J.

[21] Appl. No.: 456,308

[22] Filed: Jan. 6, 1983

[51] Int. Cl.[4] ............................................. H04N 7/167
[52] U.S. Cl. ..................................... 358/119; 358/122;
    358/123; 179/1.55; 178/22.04; 178/22.05;
    178/22.15
[58] Field of Search ............... 178/22.04, 22.05, 22.15;
    358/119, 122, 123; 179/1.5 S

[56] References Cited

U.S. PATENT DOCUMENTS

| 2,879,324 | 3/1959 | Hoffman et al. | 178/5.1 |
|---|---|---|---|
| 2,961,481 | 11/1960 | Hammond, Jr. et al. | 178/5.1 |
| 2,972,008 | 2/1961 | Ridenour et al. | 358/123 |
| 3,379,825 | 4/1968 | Banning, Jr. | 178/1.5 |
| 4,070,693 | 1/1978 | Shutterly | 358/123 |
| 4,173,025 | 10/1979 | Prehn | 358/259 |
| 4,245,246 | 1/1981 | Cheung | 358/124 |
| 4,392,021 | 7/1983 | Slate | 178/22.04 |
| 4,405,942 | 9/1983 | Block et al. | 358/117 |

Primary Examiner—S. C. Buczinski
Attorney, Agent, or Firm—P. J. Rasmussen; P. M. Emanuel; R. G. Coalter

[57] ABSTRACT

A video signal is scrambled by partitioning the signal into blocks of segments, reversing the sequence of segments in each block, randomly delaying the reversed segments and reversing the sequence of the randomly delayed segments. The double reversal of the block segment sequence results in a scrambled signal of high security but which may be unscrambled by a decoder having a complementary random delay characteristic and a total segment storage capacity which is less than that of the scrambler and also less than the maximum line-to-line interchange of the segments within each block. Selection of segment lengths provides inter-line or intra-line block scrambling.

10 Claims, 8 Drawing Figures

Fig. 3

| ENCODE SWITCH 230 POSITION | WRITE S/R 1 | S/R 2 | S/R 3 | READ S/R 1 | S/R 2 | S/R 3 |
|---|---|---|---|---|---|---|
| 1 | 21 | | | 1 (PREV.) | | |
| 2 | | 20 | | | 2 (PREV.) | |
| 3 | | | 19 | | (PREV.) | 3 |
| 1 | 18 | | | 21 | | |
| 2 | | 17 | | | 20 | |
| 2 | | 16 | | | 17 | |
| 3 | | | 15 | | | 19 |
| 1 | 14 | | | 18 | | |
| 3 | | | 13 | | | 15 |
| 1 | 12 | | | 14 | | |
| 1 | 11 | | | 12 | | |
| 2 | | 10 | | | 16 | |
| 1 | 9 | | | 11 | | |
| 3 | | | 8 | | | 13 |
| 3 | | | 7 | | | 8 |
| 1 | 6 | | | 9 | | |
| 2 | | 5 | | | 10 | |
| 2 | | 4 | | | 5 | |
| 3 | | | 3 | | | 7 |
| 2 | | 2 | | | 4 | |
| 1 | 1 | | | 6 | | |
| 1 | 21 | | | 1 | | |
| 2 | | 20 | | | 2 | |
| 3 | | | 19 | | | 3 |

← 21 LINE BLOCK IN (rows 1–21) | 21 LINE BLOCK OUT →

Fig. 5

| ENCODE SWITCH 230' POSITION | WRITE S/R 1' | S/R 2' | S/R 3' | READ S/R 1' | S/R 2' | S/R 3' |
|---|---|---|---|---|---|---|
| 1 | 3 | | | 19 (PREV.) | | |
| 2 | | 2 | | | 20 (PREV.) | |
| 3 | | | 1 | | (PREV.) 21 | |
| 3 | | 6 | | | | 1 |
| 2 | | 4 | | | 2 | |
| 1 | 7 | | | 3 | | |
| 2 | | 5 | | | 4 | |
| 2 | | 10 | | | 5 | |
| 3 | | | 9 | | | 6 |
| 1 | 8 | | | 7 | | |
| 1 | 13 | | | 8 | | |
| 3 | | | 11 | | | 9 |
| 2 | | 16 | | | 10 | |
| 3 | | | 12 | | | 11 |
| 3 | | | 14 | | | 12 |
| 1 | 15 | | | 13 | | |
| 2 | | 18 | | | 14 | |
| 1 | 19 | | | 15 | | |
| 2 | | 17 | | | 16 | |
| 2 | | 20 | | | 17 | |
| 3 | | | 21 | | | 18 |
| 1 | 3 | | | 19 | | |
| 2 | | 2 | | | 20 | |
| 3 | | | 1 | | | 21 |

(21 LINE BLOCK IN / 21 LINE BLOCK OUT)

VIDEO SCRAMBLER SYSTEM

FIELD OF THE INVENTION

This invention relates to television systems and particularly to systems for scrambling and unscrambling (or encoding and decoding) video signals by permutating or transposing lines or segments of lines.

BACKGROUND OF THE INVENTION

It is desirable to encode television signals to provide secure transmission in applications such as cable TV, satellite tranmission and subscription broadcast television. Known coding arrangements may be considered, generally speaking, to be of either the amplitude alteration type or of the time sequence alteration type. Amplitude encoders include, illustratively, those which alter the vertical or horizontal synchronizing pulse amplitude or which modulate the video signal with an encoding waveform (e.g., a sine wave) and have an advantage in that the decoder may be relatively simple and inexpensive. A disadvantage of amplitude encoding is that, generally speaking, the codes are rather easily recognized and deciphered, thus creating a potential "black market" for unauthorized decoders. From a technical standpoint, the amplitude distortion imparted to the video signal may not be completely removed by the decoder and critical decoder adjustments may be required to reduce the residual distortion of the decoded signal to acceptable levels. Other problem areas associated with scramblers of the amplitude alteration type include signal-to-noise ratio degradation and loss of dynamic range.

Encoders of the time sequence alteration type reorder the video signal sequence so as to create a non-standard signal sequence which may be changed at random so as to provide a very high level of security. Examples of such encoders are those which reverse the sequence of picture elements within a line, those which transpose or interchange lines within a field and those which transpose or rearrange segments of each line of the video signal as described in U.S. Pat. No. 4,070,693 to Shutterly. In addition to the advantage of high security, such arrangements are generally characterized by very low levels of residual amplitude distortion but heretofore have required relatively complex (and expensive) encoders and decoders owing, mainly, to the requirement for storing the video signal during encoding and decoding.

SUMMARY OF THE INVENTION

It is an object of the invention to provide a scrambling system, suitable for use with video or other signals, which provides low residual signal distortion and preserves the quality of parameters of the processed signal such as its bandwidth, its signal-to-noise ratio and its dynamic range.

It is a further object of the invention to provide a scrambling system of the line or line segment permutation type having a relatively high level of security and which may be implemented with substantially reduced signal storage requirements in the decoder portion of the system.

Apparatus for scrambling an input signal, in accordance with the invention, comprises a first memory means of the first-in last-out type for storing the input signal in blocks of sequentially ordered segments and for recovering the stored segments of each block to provide a first output signal. A source supplies a predetermined code to a second memory means which imparts a variable delay to selected ones of the reverse ordered segments of each block of the first output signal in accordance with the code and provides a second output signal in which the reverse ordered segments of each block are effectively randomly interchanged. A third memory means of the first-in last-out type reverses the segment sequence of each block of the second output signal to provide a scrambled output signal in which the segments of each block are reversed in sequence, randomly interchanged and again reversed in sequence.

In accordance with a further aspect of the invention, a decoder for a signal scrambled as described comprises a source for providing an inverse code and a further memory for imparting variable delay to selected segments of the scrambled signal in accordance with the inverse code.

BRIEF DESCRIPTION OF THE DRAWING

The invention is illustrated in the accompanying drawing wherein like elements are identified by like designators and in which:

FIG. 3 is a table illustrative of a selected operating mode of the encoder of FIG. 2;

FIG. 5 is a table illustrative of a selected operating mode of the decoder of FIG. 4;

DETAILED DESCRIPTION OF THE PREFERRED EMBODIMENT

Figure 1:
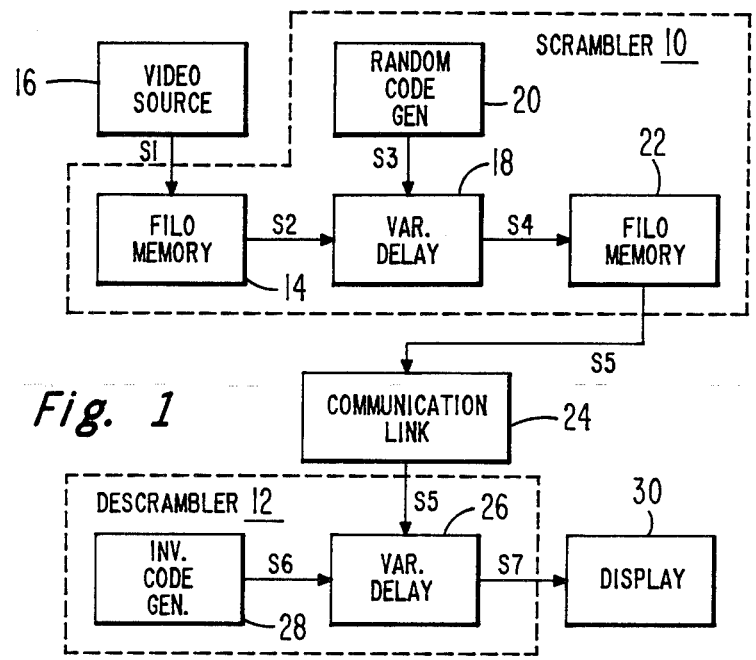
FIG. 1 is a block diagram of a secure television transmission system embodying the invention.

The system of FIG. 1 illustrates the principles of the present invention by which the memory requirements of a descrambler 12 can be substantially reduced by performing, in effect, a double reversal of the sequence of segments of a video signal in the scrambler 10. As will be explained, the "segments" (i.e., lines or portions of lines, as used herein) are interchanged or reordered in the scrambler in such a manner that the separation between the reordered segments is greater than the total segment memory capacity of the descrambler. By this feature of the invention, one obtains what might seem to be two mutually exclusive benefits. Specifically, the encoded signal has the high security characteristic of systems which interchange segments within large blocks of the video signal yet the resultant scrambled signal may be descrambled by a relatively simple decoder having much less memory capacity than the segment-to-segment interchange would seem to require.

The scramber 10 (outlined in phantom) comprises a memory 14 of the first-in last-out type (FILO) for storing a video input signal S1 produced by a video signal source 16. For cable TV applications, source 16 may comprise, illustratively, equipment for microwave or satellite TV receiving or equipment (camera, recorders, etc.) for producing locally originated program material. Memory 14 stores the signal S1 in blocks of sequentially ordered segments and recovers the stored segments of each block in reverse order to provide a first output signal S2. Memory 14, illustratively, may comprise a random access memory (RAM) in which the video signal is digitized and partitioned into segments which are stored in sequential memory locations and then recovered by addressing the memory locations in reverse order. A specific example of a 21 line block FILO memory is discussed subsequently.

The reverse sequence video signal S2 is applied to a variable delay unit 18 which receives a cyclic predetermined code signal S3 from a code generator 20. Unit 18 imparts variable delay to selected ones of the reverse ordered segments of each block of the first output signal S2 in accordance with the code S3 to provide a second output signal S4 in which the reverse ordered segments of each block are effectively randomly interchanged. As will be shown by example subsequently, unit 18 may comprise a plurality of selectively addressable shift registers equal in number to the total number of unique states of the code signal S3.

The remaining element of scrambler 10 comprises a further FILO memory 22 which reverses the segment sequence of each block of the second output signal S4 to provide a scrambled output signal S5 in which the segments of each block are reversed in sequence, interchanged in accordance with the code and again reversed in sequence. The encoded signal has the property that segments of the signal S1 are randomly dispersed throughout large blocks of the encoded signal S5 yet the total memory needed for decoding is relatively small (much less than one block). Specifically, the descrambler memory capacity, expressed in "segments" (i.e., complete or fractional TV lines) is equal to the number of allowable "states" or values of the predetermined code signal S3.

The scrambled signal S5 is applied to descrambler 12 via a communications link 24 which, for cable TV applications, may comprise a group of video amplifiers for driving subscriber distribution cables. For subscription broadcast TV applications, the link 24 would comprise a broadcast transmitter and a plurality of individual receivers, one for each subscriber decoder. The descrambler 12 comprises a variable delay unit 26 and an inverse code generator 28 which are essentially duplicates of the corresponding elements 18 and 20 of the scrambler 10 except that the code signal S6 produced by generator 28 is "reversed" or complementary to that produced by generator 20. Unit 26 imparts variable delay to selected segments of each block of the scrambled signal S5 in accordance with code S6 to de-interleave the scrambled signal and supply a fully decoded video signal S7 to a display unit 30 (e.g., a subscriber TV set or other utilization device).

It is seen in the foregoing example of the invention that the bulk of the system memory requirements reside in the scrambler 10. This reduces the decoder cost and improves its reliability which are important considerations in subscription TV applications where the communication line 24 "feeds" large numbers of individual descramblers. The remaining FIGURES herein provide specific examples of elements of the overall system and show in more detail how the "double reversal" of the segment sequence which takes place in the scrambler interleaves the segments within large blocks of the encoded signal to enable simplified decoding.

Figure 2:
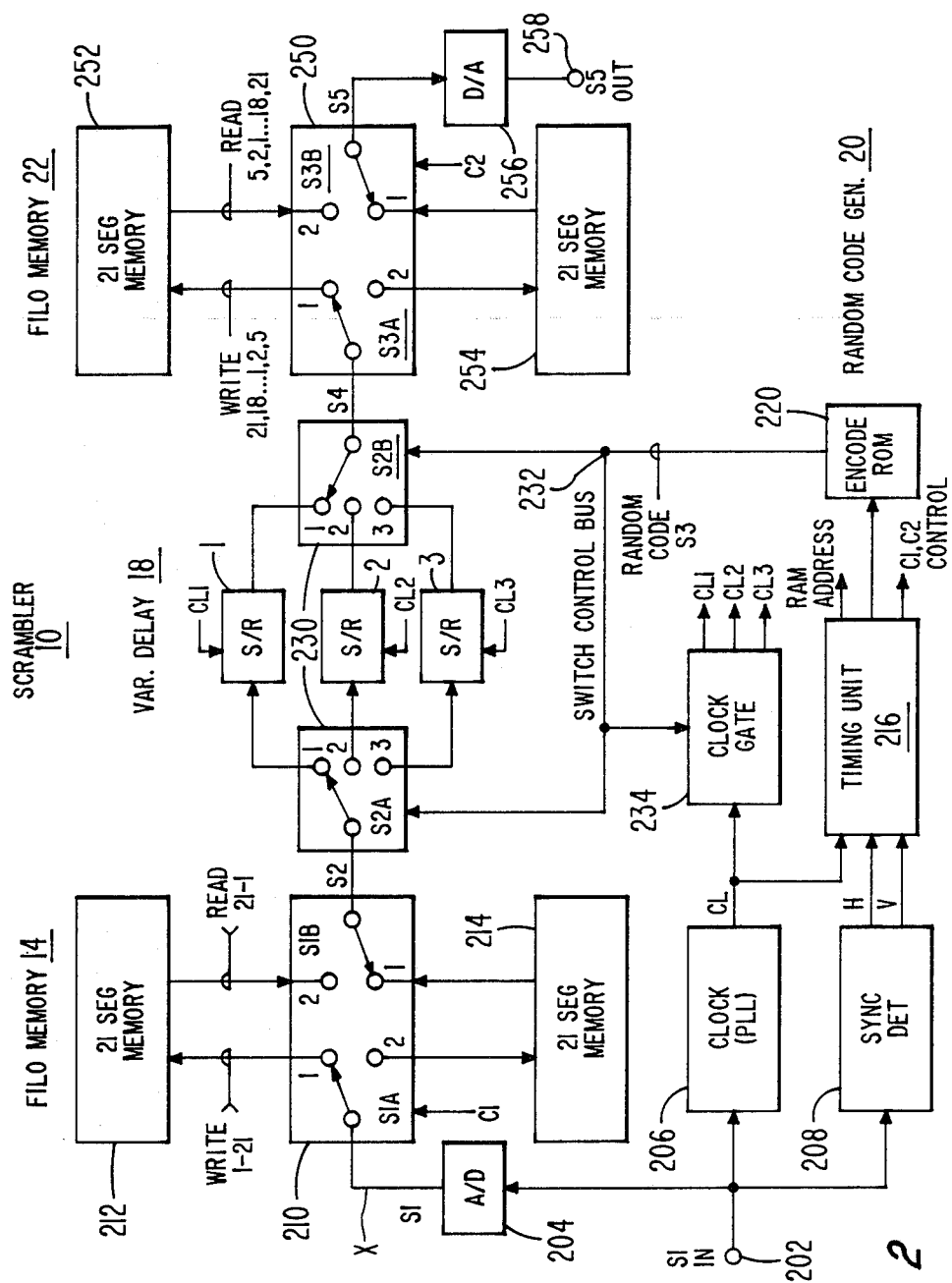
FIG. 2 is a detailed block diagram of the encoding (scrambling) portion of the system of FIG. 1.

The scrambler 10 of FIG. 2 is configured to process video signal S1 in blocks of 21 segments per block with block interleaving controlled by the predetermined "pseudo-random" code S3 which, in this example, has three permissible "states" or code conditions. The signal S1 to be scrambled is applied to an input terminal 202 which is coupled to an analog-to-digital (A/D) converter 204, a clock generator 206 and a sync signal detector 208. Clock 206, illustratively, may comprise a phase locked loop (PLL) locked to four times the color subcarrier frequency to generate a high frequency clock signal (CL) for generating timing signals for clocking various memories in the scrambler as will be explained.

After conversion to digital form, the signal S1 is applied to section S1A of a double-pole double-throw switch 210 of FILO Memory 14. Section S1A of switch 210 alternately couples signal S1 to the inputs of a pair of 21 segment random access memories (RAMS) 212 and 214 in response to a control signal C1. For purposes of illustration and explanation, it will first be assumed that it is desired to scramble signal S1 on a line-by-line basis (inter-line block coding) rather than on a fractional line basis (intra-line block coding). For this purpose, each segment will correspond to one line of the video signal and the switch 210 control signal C1 would be timed to change state every 21 lines to cause memories 212 and 214 to store alternate blocks of 21 lines of the signal S1. The control signal C1 and address codes for memories 212 and 214 are produced by counters in a timing unit 216 which are clocked by the clock signal CL and synchronized by the vertical (V) and horizontal (H) sync signals produced by detector 208. The reverse line sequence signal S2 is obtained from memories 212 and 214 by the second section S1B of switch 210 which is coupled to "read" memory 214 while memory 212 is being written and vice versa. During the read operation the memory addresses are reversed so that the stored lines are received in reverse order (21, 20, 19 . . . 2, 1) to which they were written (1, 2, . . . 19, 20, 21).

Variable delay unit 18 scrambles (interchanges) the reverse sequence lines of each block (21 lines) of the signal S2 in response to the predetermined code S3 produced by a read only memory 220 which receives address signals from timing unit 216. Unit 18 comprises three one-line shift registers 1, 2, and 3 and a double-pole triple-throw switch 230 having a first section S2A connected to selectively apply signal S2 to the shift register inputs and a second section S2B connected to selectively couple the shift register outputs to FILO memory 22. The cyclic code signal S3 is applied to switch sections S2A and S2B via a common control bus 232 which also controls a clock gate 234 that distributes the shift register clock signals CL1, CL2 and CL3. When code S3 is in a first state, switch section S2A and S2B are placed in position 1 and the clock signal CL1 is supplied to shift register 1. The operation is similar for the other two code states whereby every time a new line is stored in one shift register the previous line stored therein is simultaneously read out to form the signal S4.

Memory 22 reverses the line sequence of each block of 21 lines of the signal S4 and comprises a pair of 21 line memories (252 and 254) and a further double-pole double-throw switch 250 the elements of which are connected as the corresponding elements in FILO 14. The scrambled signal produced at the output of the second section (S3B) of switch 250 is coupled via a digital-to-analog (D/A) converter 256 to an output terminal 258 for transmission via communication link 24 to descrambler 12.

FIG. 3 shows the relationship of a specific predetermined code to the switching of the three shift registers (S/R) by the signal S3. The position of switch 230, which corresponds to the code produced by ROM 220, are shown in the first column. The code "values" range between 1 and 3 within each 21 line block (one complete block is shown). A value of "1" corresponds to position "1" of switch 230 which controls the read-write sequence of shift registers 1, 2 and 3. Switch 230, as seen, is switched successively to positions 1, 2, 3, 1, 2, 2, 3, 1 . . . etc. until all 21 lines of a block have been interleaved and the process repeats for the next block.

Since the block of 21 lines supplied to S2A from S1B are in reverse order, line 21 is stored in S/R 1, line 20 is stored in S/R 2, line 19 in S/R 3 etc. as shown in the second ("Write") column. Each time a line is stored in any register, the previous line is read out and the stored contents remain in the register until it is again addressed by switch 230. Note, for example, that line 21 is stored in S/R 1 and replaced by line 18 three lines later. Line 6 is stored for a much longer time, being replaced in S/R 1 by line 1 five lines after it was stored. It is thus seen that even though the total memory capacity of shift registers 1, 2 and 3 is only 3 lines at any one time, the effective delay for any one line between the time it is stored and read out can be any value up to a maximum of the block length (21 lines in this example) of the code.

The third column shows the read sequence for registers 1, 2 and 3. As lines 21, 20 and 19 are being written (Col. 2), the last three lines (1, 2 and 3) of the previous block of lines processed are read. These are followed by lines 21, 20, 17, 19, 18 . . . etc. from the present block. Again it will be noted that the time separation of some of the lines within the block is greater than the total number of one line shift registers (3). Line 17, for example, is separated from line 16 by six lines and line 14 is displaced from line 13 by four lines.

As will now be explained in detail, the sequence of lines represented by the third column of FIG. 3 can be decoded by a three line store if the line sequence is again reversed. FILO 22 provides this block line reversal as previously noted. The encoded or scrambled line sequence as it is obtained from FILO 22 may be determined from FIG. 3 by reading the third column in reverse order beginning with the last line of the "output block". The reverse 21 line sequence is 3, 2, 1, 6, 4, 7 . . . 17, 20, 21.

Figure 4:
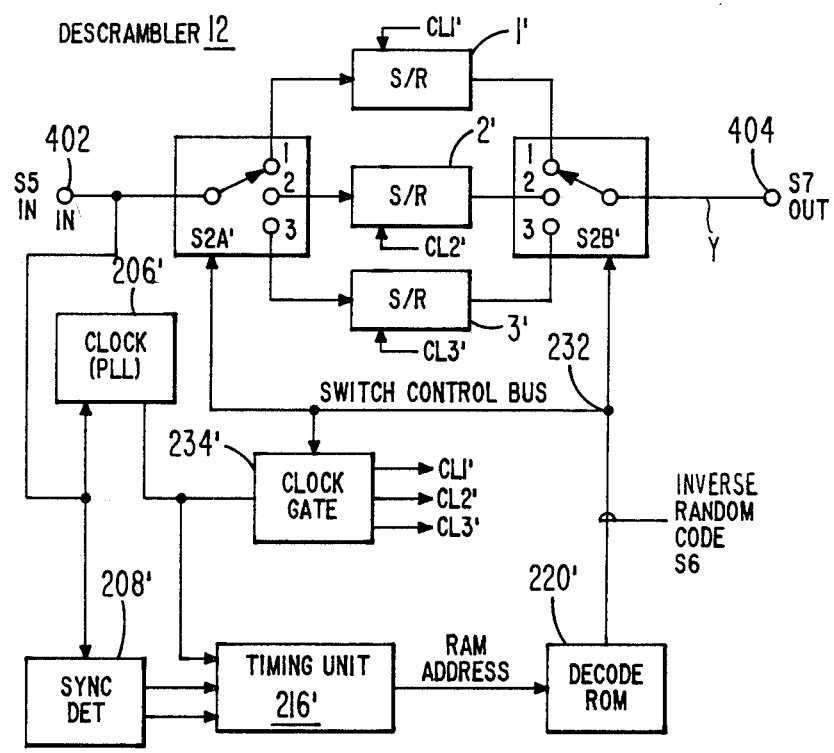
FIG. 4 is a detailed block diagram of the decoding (descrambling) portion of the system of FIG. 1.

The descrambler 12 of FIG. 4 is similar to the scrambler 10 of FIG. 2 but excludes the two FILO memories and the A/D and D/A converters. The converters may be retained if the shift registers 1', 2' and 3' are binary registers. It is assumed here that they are of the charge-coupled-device (CCD) type which are clocked analog registers. The timing unit 216' is similar to unit 216 but is simplified by the omission of the RAM address lines and the C1 and C2 control lines. The decoder ROM 220' is similar to the encoder ROM 220 but contains a reverse sequence 21 line code as will be explained.

Figure 6:
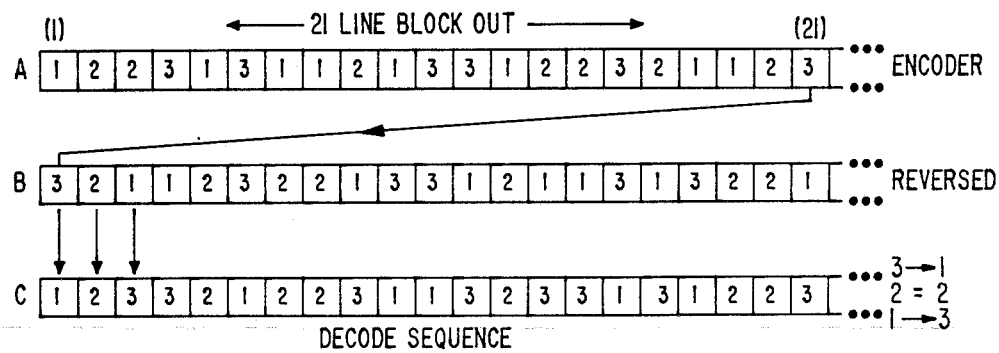
FIG. 6 is a table relating encode and decode code sequences.

Operation of descrambler 12 is illustrated in FIG. 5 which shows the switoh 230' position (which corresponds to the decoder code) and the read and write sequences. Comparing column 1 of FIGS. 3 and 5 it will be noticed that the code coefficients are reversed (i.e., in descending order) in the descrambler and "interchanged" (i.e., threes are replaced by ones and vice-versa). This is illustrated in the table of FIG. 6 where sequence "A" is the "encode" sequence "B" is sequence "A" reversed and sequence "C", the decode sequence, is sequence "B" with "threes" and "ones" interchanged.

The scrambled signal S5 applied to the descrambler input terminal 402 is written in registers 1', 2' and 3' as shown in the second column of FIG. 5. As lines 3, 2 and 1 are being stored by switch S2A' the lines 19, 20 and 21 of the previous block of lines are read by switch S2B' (col. 3). Thereafter all lines of the current block appear in their original numerical sequence (1–21). From col. 2 it is seen that line 13 is stored in register 1' for five lines thereby receiving an effective delay of five lines within the block. Lines 10 and 16 are delayed in register 2' by 5 and 6 lines each. Line 6 is delayed in register 3' by five lines. More complex patterns of transposition or line interchange within a block may readily be implemented by appropriate code choice.

In the specific examples of FIGS. 2–6 it was initially assumed that each segment of the signal S1 was one line in length. With this assumption it was seen that the signal was scrambled in blocks of 21 lines each. The encoder memory used was 42 lines in each, FIFO and 3 lines for the shift registers for a total of 87 lines. Only 3 lines of memory were used in the decoder. It is a feature of the invention that the decoder memory requirements for the same basic format (21 segment blocks, 3 segment variable delay) may be reduced even further by appropriately changing the segment length.

As an example, assume now that each segment of the FILO memories (212, 214, 252, 254) of FIG. 2 have a capacity of one third of one line and that the shift registers also have one-third line capacities. In this case each block of 21 segments will require only 7 lines of storage in each of memories 212, 214, 252 and 254 and the shift register storage will equal one line. Thus the total scrambler memory requirements are reduced to only 29 lines and the decoder only requires one line. The scrambled signal will still comprise 21 segment blocks with the three segments of each line dispersed "pseudo-randomly" in three line blocks in accordance with the predetermined code. This principle may be extended to provide "finer" and thus more secure scrambling without increasing the decoder memory capacity by dividing each line into finer segments (e.g., one-seventh or one-ninth line segments) and increasing the number of shift registers and the level of code complexity.

Figure 7A:
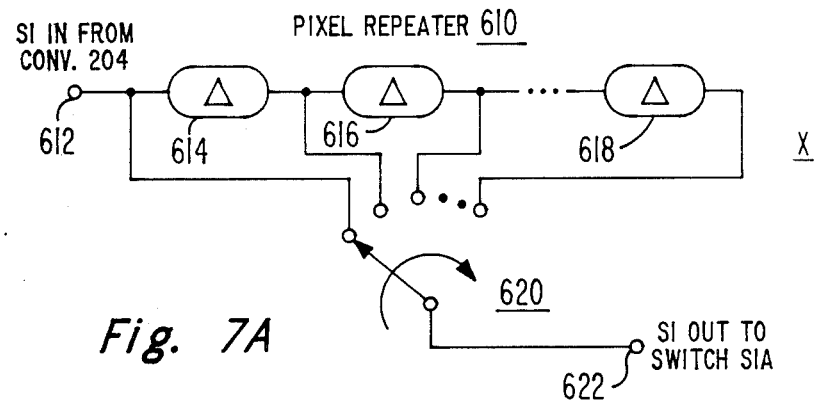
FIGS. 7A and 7B are block diagrams illustrating modifications of the encoder of FIG. 2 and the decoder of FIG. 4, respectively.
Figure 7B:
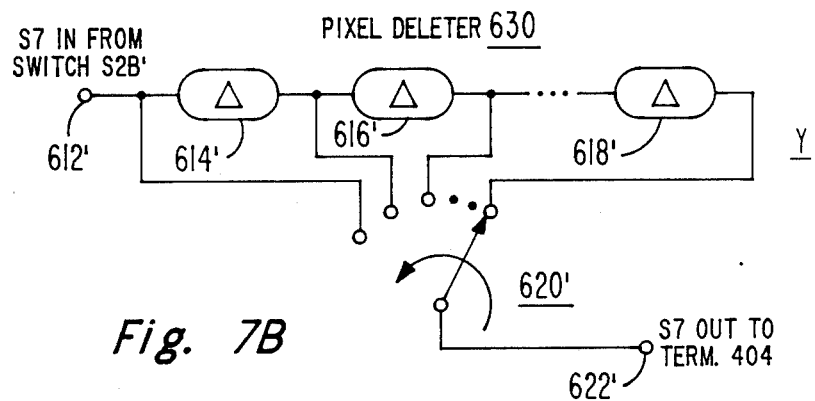

FIGS. 7A and 7B illustrate desirable modifications of the scrambler 10 of FIG. 2 and the descrambler 12 of FIG. 4 when using the "intra-line" scrambling as noted above. When the stored segments are less than one line in length, discontinuities in the scrambled signal occur within a line where the reordered segments meet. Referring to FIG. 1, these discontinuities may result in distortion (ringing, overshoot, undershoot) due to bandwidth limitations when the scrambled signal S5 is passed through the communication link 24 to the descrambler 12. To avoid this problem, it is desirable to repeat the last few "picture elements" (PIXELS) of each segment which ends within a TV line before scrambling the segments. In the descrambler, the added PIXELS will contain the transient disturbance (if any). The disturbance may then be removed by deleting the added PIXELS from the descrambled signal S7.

FIG. 7A is a block diagram of a PIXEL repeater 610 which adds the extra PIXELS to the signal S1. The repeater 610 may be interposed in the path between converter 204 and switch section S1A (e.g., at the point marked "X" in FIG. 2). It is important that the extra PIXELS be added to S1 prior to scrambling. If it were done after scrambling there would be two discontinuities formed between each pair of adjacent segments and subsequent PIXEL removed would correct only one of the discontinuities. By adding the extra PIXELS prior to rearrangement of the segments, the segments are "spliced" at the intersections of the added PIXELS so that when reordered (scrambled) only one discontinuity occurs at each "splice" between repeated PIXELS.

The repeater comprises a tapped delay line in which each delay section (614, 616, 618) provides a delay of about 4 PIXELS (280 nanoseconds). The input of the line is connected to an input terminal 612 for receiving the signal S1. The input terminal 612 and each tap are connected to a commutator switch 620 which rotates in the direction shown to provide progressively delayed output signals to output terminal 622.

In operation, switch 620 is initially in the position shown to pass the first segment of a line without delay. At the end of the first segment the switch is advanced one step thereby causing the last 4 PIXELS to be repeated. This process is repeated for each segment of a line until each segment receives 4 repeated PIXELS, then the process repeats for the next line. The extra PIXELS added to signal S1 increase the length of the "active" line by 840 nanoseconds. This added time may be compensated for by foreshortening the "front porch" interval of the next subsequent horizontal synchronizing signal by an equal amount so that no information is lost during the "active scan" interval due to the added repeated PIXELS and the total line length is not in excess of the standard line period.

The PIXEL deleter 630 of FIG. 7B is connected at the descrambler output (e.g., at the point "Y" in FIG. 4) and is identical to the PIXEL repeater of FIGURE 7A except that the commutator switch 620' is rotated in the opposite direction (CCW). At the end of each line segment the commutator switch advances one step, thereby skipping over the PIXELS that were added in the scrambler and thus effectively "discarding" the transient disturbances following each segment.

Other embodiments of the invention will be apparent to those skilled in the art. For example, the FILO memories may be analog CCD delay lines in which the signal is clocked into a port for the duration of a block (for example, 21 lines) and which is then read from the same port. The random code may be pseudo-random, and may be machine-generated or predetermined. Also, the shift registers in the scrambler and descrambler may be of the bidirectional type to reverse the picture element sequence in selected segments of each block to provide additional scrambling security.

What is claimed is:

1. Apparatus for scrambling an input signal, comprising:
   (a) first memory means of the first-in last-out type for storing said input signal in blocks of sequentially ordered segments and for recovering the stored segments of each block in reverse order to provide a first output signal;
   (b) a source for providing a predetermined code;
   (c) second memory means for imparting variable delay to selected ones of the reverse ordered segments of each block of said first output signal in accordance with said code to provide a second output signal in which the reverse ordered segments of each block are interchanged in response to said code; and
   (d) third memory means of the first-in last-out type for reversing the segment sequence of each block of said second output signal to provide a scrambled output signal in which the segments of each block are reversed in sequence, interchanged in response to said code and again reversed in sequence.

2. Apparatus as recited in claim 1 wherein said second memory means comprises a plurality of shift register means, each having a storage capacity substantially equal to one of said segments, the total number of said plurality of shift register means being less than the total number of segments in each of said blocks of segments.

3. Apparatus as recited in claim 1 further comprising a descrambler, said descrambler comprising:
   a second source for providing a second predetermined code; and
   a fourth memory means for imparting variable delay to selected segments of each block of said scrambled output signal in accordance with said second code to provide a descrambled output signal substantially identical with said input signal supplied to said first memory means.

4. Apparatus as recited in claim 3 wherein said fourth memory means comprises a plurality of shift register means, each having a storage capacity substantially equal to one of said segments, the total number of said plurality of shift register means being less than the total number of segments in each block of said scrambled signal.

5. Apparatus as recited in claim 1 wherein:
   said input signal comprises a video signal;
   each said segment comprises one line of said video signal; and
   each said block comprises N segments, N being an integer and less than the total number of lines in one field of said video signal.

6. Apparatus as recited in claim 5 wherein the number N is equal to an integral multiple of a root of the number of lines in one frame of said video signal.

7. Apparatus as recited in claim 1 wherein:
   said input signal comprises a video signal;
   each said segment comprises a fraction of one line of said video signal, and further comprising:
   pixel repeater means for inserting additional picture elements in each segment of said video signal prior to storage of said video signal in said first memory means.

8. Descrambler apparatus, comprising:
   an input node adapted to receive a scrambled signal of the form representative of an input signal divided into blocks of sequentially ordered segments, the segments of each block being reversed in sequence, interchanged in accordance with a predetermined code and again reversed in sequence to form said scrambled signal;
   a source for providing a further predetermined code related to said predetermined code; and
   a memory means coupled to said node and responsive to said further code for imparting variable delay for interchanging selected segments of each block of said scrambled signal to provide a descrambled output signal.

9. Descrambler apparatus as recited in claim 8 wherein said memory means comprises a plurality of shift register means, each having a storage capacity substantially equal to one of said segments, the total number of said plurality of shift register means being less than the total number of segments per block of said scrambled signal.

10. Descrambler apparatus as recited in claim 8 wherein said input signal comprises a video signal, wherein each said segment comprises a fraction of one line of said video signal, wherein the terminal portion of each segment includes repeated picture elements added to said video signal prior to the scrambling thereof, and further comprising:

pixel deleter means responsive to said descrambled output signal for removing said repeated picture elements.

* * * * *